United States Patent
Peters

(10) Patent No.: US 6,698,785 B2
(45) Date of Patent: Mar. 2, 2004

(54) TRAILER IMPACT SUPPRESSION APPARATUS

(75) Inventor: Weldon J. Peters, Nanton (CA)

(73) Assignee: Rubber Ride Hitches LTD (CA)

( * ) Notice: Subject to any disclaimer, the term of this patent is extended or adjusted under 35 U.S.C. 154(b) by 47 days.

(21) Appl. No.: 09/983,273

(22) Filed: Oct. 23, 2001

(65) Prior Publication Data

US 2002/0053782 A1 May 9, 2002

Related U.S. Application Data

(60) Provisional application No. 60/246,614, filed on Nov. 8, 2000.

(51) Int. Cl.[7] .................................................. B60D 1/50
(52) U.S. Cl. ........................................................ 280/489
(58) Field of Search ........................ 280/483, 484–495, 280/439, 440

(56) References Cited

U.S. PATENT DOCUMENTS

| | | | | |
|---|---|---|---|---|
| 3,199,903 A | * | 8/1965 | Wood ........................ 403/224 |
| 3,863,956 A | * | 2/1975 | Khan ......................... 280/483 |
| 3,868,098 A | * | 2/1975 | Coombs ..................... 267/138 |
| 4,326,730 A | * | 4/1982 | Tomen ....................... 280/502 |
| 4,792,154 A | * | 12/1988 | Kerst et al. ................. 280/489 |
| 4,991,864 A | * | 2/1991 | Potsch ........................ 280/441 |
| 5,423,565 A | * | 6/1995 | Smith ...................... 280/411.1 |
| 6,220,618 B1 | * | 4/2001 | Smith et al. ................ 280/447 |
| 6,474,674 B2 | * | 11/2002 | Piercey, III ................. 280/441 |
| 6,494,478 B1 | * | 12/2002 | MacKarvich .............. 280/489 |

* cited by examiner

*Primary Examiner*—Lesley D. Morris
*Assistant Examiner*—Paul Royal, Jr.
(74) *Attorney, Agent, or Firm*—Andrew C. Aitken; Venable LLP

(57) ABSTRACT

A hitch mounting assembly for connecting a vehicle to an object. The hitch includes a first member mountable to the vehicle and a second member for receiving the object that is displaced from the fixed member by a plurality of elongate relevant members.

11 Claims, 4 Drawing Sheets

TRAILER IMPACT SUPPRESSION APPARATUS

The present invention relates to the field of hitches, and more particularly, to hitches for connecting trailers to automobiles and light trucks. The applicant claims the benefit of U.S. application Ser. No. 60/246,614, filed Nov. 8, 2000.

BACKGROUND OF THE INVENTION

Coupling systems for connecting trailers or sleds to motor vehicles encounter significant shock and vibrational forces under normal towing conditions. These coupling systems, commonly known as hitches, typically include a rigid body attached to the vehicle linked to another rigid body that is attached to the trailer. As the trailer and vehicle move with respect to one another, the rigid bodies are subject to forces in a number of directions.

A first conventional type of hitch, referred to as a ball hitch, employs a semi-spherical or ball-shaped extension that is supported by a vertically oriented pin. The pin is typically connected either to a rigid tow plate or draw-bar that is in turn, attached to the vehicle. The ball is engineered to engage an opposite coupling, usually mounted on an extension referred to as a tongue, that fits over the top of the ball-shaped extension or otherwise engages the ball. In most conventional circumstances, the ball hitch is attached to the vehicle and the coupler is located on the trailer. This arrangement creates a fairly rigid towing system but allows the trailer to pivot in a horizontal plane with respect to the vehicle and allows limited pivoting movement in a vertical direction. This type of system, like most other hitch engagements, transmits considerable shock and vibration between the trailer and the towing vehicle. As referred to above, the ball hitch may be attached to vehicles using a draw bar tube which allow for easy removal of the ball hitch. A draw bar tube is an elongate member that is received within an opposite draw bar receiving tube. The draw bar receiving tube is typically affixed to the vehicle in a permanent manner or semi-permanent manner using fasteners or by welding.

Another commonly used linking arrangement involves a vertically oriented pin that is provided on the trailer which is received in a collar located on the vehicle. This engagement, commonly referred to as a king-pin engagement, is typically used for towing heavy loads and requires the towing vehicle to bear a significant portion of the trailer weight. In a king-pin arrangement, the pin can pivot within the collar and has some freedom to move within the collar in a vertical direction.

As discussed above, conventional ball hitches are frequently attached to vehicles using a draw bar arrangement. In this type of arrangement, a first hollow receiver tube is mounted to the underside or bumper of the towing vehicle that receives a second draw bar tube. A pair of opposite corresponding holes may be formed on opposite sides of both the receiver tube and draw bar. A connector pin is inserted through the holes to connect the receiver tube and draw bar and thereby prevent rectilinear movement. In some arrangements a trailer hitch assembly or L-shaped tow plate having a conventional form of hitch ball is secured to the draw bar. The connecting pin assembly of the draw bar arrangement allows for a releasable interconnection between the receiver tube of the towing vehicle and the draw bar of the towed trailer.

In each of the examples, constant shock and vibrational forces in various directions will be transmitted from the trailer to the hitch and consequently to the towing vehicle causing wear to the vehicle and hitch, and an uncomfortable ride. The shock and vibrational forces acting on the hitch have numerous sources. For example, upon acceleration or deceleration of the towing vehicle, momentum and inertial forces due to the loads contained on the trailer are longitudinally transmitted from the trailer to the towing vehicle. Uneven and rough surfaces upon which the vehicles are traveling are also a source of both longitudinal and vertical forces acting on the hitch and trailer. It is well known that undue wear and damage to the towing vehicle, the hitch, and the trailer result from the continuous shock and vibration commonly associated with towing a trailer. Vibration and wear are cumulative problems in regard to loosening fasteners and abrasively eroding joints parts and in general on both the vehicle and trailer. In addition to the respective wear on the vehicles, the existence of significant forces being transferred to the vehicle from the trailer makes driving the towing vehicle unpleasant because it adversely effects the ride of the vehicle.

To overcome the problems associated with shock and vibration, trailer hitches with many different dampening mechanisms have been developed and proposed within the related art. Most of the previously proposed hitches with dampening mechanisms have addressed vibration and shock adsorption in either the veitical or longitudinal directions. For example, one such system that address longitudinal shock and vibration is disclosed in U.S. Pat. No. 4,817,978 to James (the '978 patent). The system disclosed in the '978 patent employs a resilient rubber or plastic block assembly within the draw bar tube to dampen fore and aft longitudinal shock and vibration. The '978 patent dampens vibrations at the connector pin connecting the draw bar and receiving tube. U.S. Pat. No. 3,961,813 to Thomas also addresses longitudinal shock but proposes to dampen shock through an assembly at the coupling member itself. The patent to Lovell, U.S. Pat. No. 4,351,542 addresses vertical shock and vibration by the use of coiled springs located in the coupling between the hitch frame and the coupler. Another system disclosed in U.S. Pat. No. 4,773,668 by Muonro; provides for dampening on a vertical axis by means of a resilient bushing inserted into the draw bar of a trailer hitch. A system that has addressed vibration and shock in both the vertical and horizontal directions is disclosed in the Van Vleet Patent, U.S. Pat No. 5,823,560. The system disclosed by Van Vleet proposes an arrangement of bullet shaped cushions within the draw bar to dampen shock.

Despite the numerous approaches in the related art, there nevertheless remains a need for improved and alternative manners to connect vehicles to trailers that reduce vibration, noise and wear of the connecting members.

SUMMARY OF THE INVENTION

The present invention involves providing a dampening mechanism and hitch connector assemblies for connecting hitches for towing trailers. The invention involves providing a pair of concentric elongate members that have a resilient member or series of members interposed between one another. One of the elongate members has an engagement location for the hitch or a hitch receiving member on which a hitch is mounted, that is positioned transverse to the orientation of travel of the vehicle and trailer. Shock and vibration imposed from the trailer are transmitted through the hitch and dampened by the resilient member or members. The invention can be employed with a variety of hitches including king-pin type arrangements, ball bitches and ball hitches that are mounted on conventional draw bars.

DETAILED DESCRIPTION OF THE INVENTION

Figure 1:
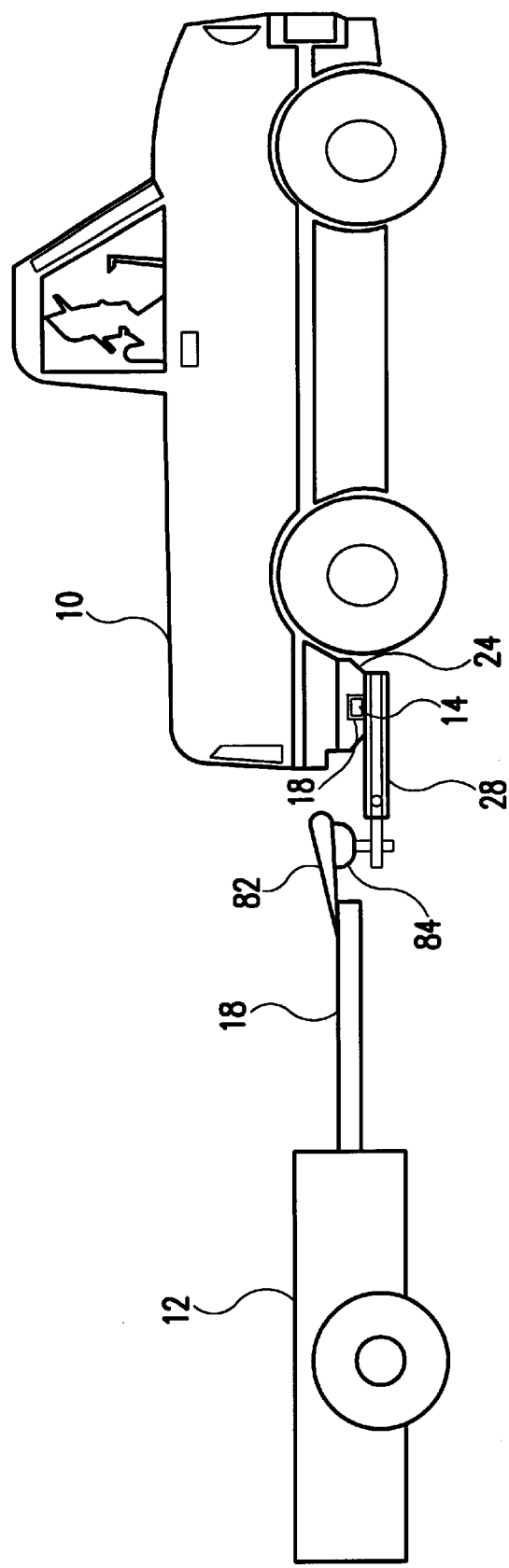
FIG. 1 depicts a first embodiment of the invention using a ball hitch to connect a vehicle and a trailer in elevation.

Now referring to FIG. 1, a vehicle 10 is depicted in engagement with trailer 12 using a hitch connector assembly according to the invention. Trailer 12 includes yoke or tongue 18 on which is mounted a coupler 82 adapted to engage a conventional ball hitch 84. The ball hitch is mounted on draw bar 30 that is received in draw bar receiving tube 28. Draw bar receiving tube 28 is affixed to the floating member 18 of the transverse dampening assembly that also includes fixed transverse core member 14 and a plurality of elongate resilient members. The transverse damping assembly is attached to vehicle 10 by bracket 18.

Figure 2:
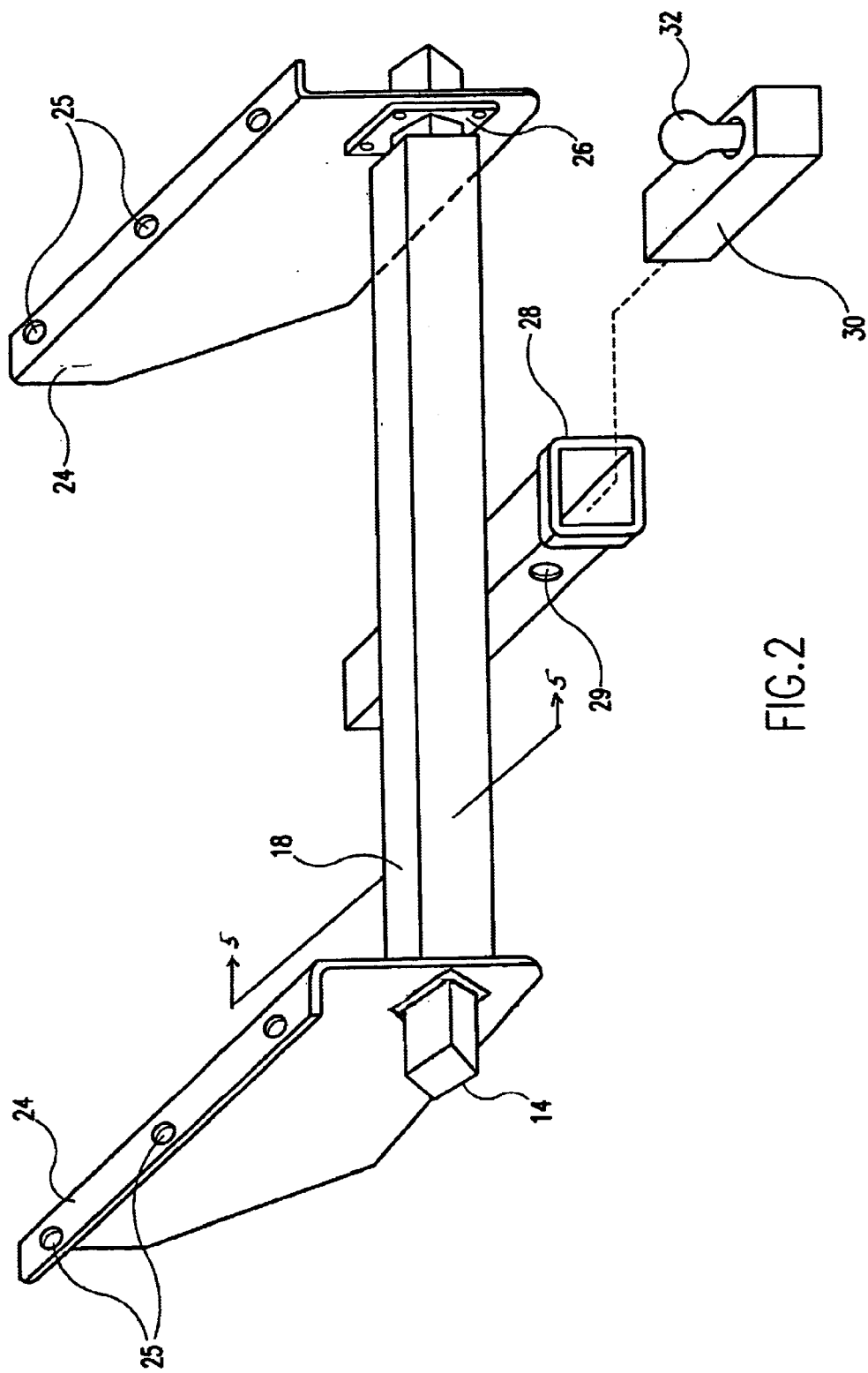
FIG. 2 is a perspective view of a first embodiment of a hitch connector assembly in accordance with the present invention.
Figure 5:
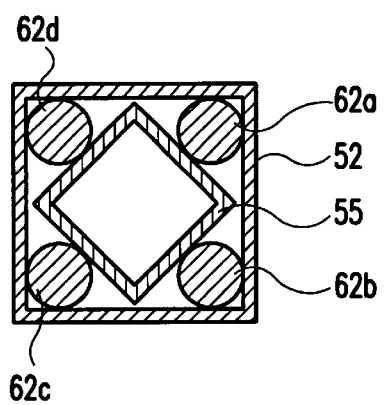
FIG. 5 is a cross sectional taken along line 5—5 in FIG. 2 of the transverse elongate member and floating member according to the invention.

Now referring to FIG. 2, on one end of draw bar 30 is a removable ball hitch 32 that may be engaged by an opposite coupling on a trailer. The draw bar has a through hole 33 for receiving a retention pin that fastens the draw bar to the draw bar tube. Draw bar 30 is received by draw bar receiving tube 28 that has an internal dimension to closely conform with the exterior dimension of draw bar 30. Although a straight tubular draw bar is depicted in FIG. 2, other draw bar arrangements such as solid bars and draw bars that include angled portions and thus allow the ball hitch to be presented at a lower elevation with respect to the elevation of the draw bar receiving tube can also be used in accordance with the present invention. Draw bar receiving tube 28 is fastened to floating transverse member 18 so that the member 19 and tube 28 are fixed with respect to each other. The connection between draw bar receiving member 28 and transverse floating member 18 can be made by welding or by other methods such as the use of nuts and bolts. Floating member 18 rests on four resilient elongate members such as member 20 that connected the floating member 18 to fixed transverse core member 14. In a preferred embodiment these resilient members are made of solid vulcanized rubber however, other compressible resilient materials such as polyurethane may be employed. The resilient members are in compression between the floating transverse member and serve to dampen shock from the trailer along the length of the transverse members. FIG. 5 depicts a cross sectional view taken along line 5—5 shown in FIG. 2. Although the resilient member 62b is shown merely in contact with the sidewall 55 of exterior floating member 18, in the preferred device, resilient member 62b is in compression between interior sidewall 55 and the interior wall 52 of fixed transverse core member 14. Constructed in this manner, the exterior floating member 18 is suspended on the resilient members in a manner that allows the exterior floating member to move with respect to the inner member in response to forces acting on the draw bar.

Now referring back to FIG. 2, one end of fixed transverse core member 14 is attached to bracket 24 while the opposite end is attached to bracket 24 using collar 26. The opposite brackets are attached to the vehicle by welding or the use of fasteners. This arrangement results in a fairly rigid assembly of the opposite brackets, collar and transverse interior member while the floating member and draw bar tube are separated from the rigid attachment by the resilient members. The assembly also allows for limited movement of the floating member in the horizontal and vertical direction and provides for rotational movement of the floating member 18 with respect to the fixed transverse core member 14. The floating member itself may flex along its length without transmitting these forces directly to the rigid assembly. The elongate resilient members further serve to dampen the shock and vibration from the floating torsion member along the entire length.

Fixed transverse core member 14 has a smaller cross-sectional diameter than the outer floating torsion member 18 so that fixed transverse core member 14 can be inserted and run throughout the hollow length of the floating torsion member 18. The mounting brackets such as 24a and 24b are then affixed to a towing vehicle to secure the trailer hitch assembly to the towing vehicle. In an exemplary embodiment, the fixed transverse core member 14 and torsion member 18 can be constructed of steel or any other heavy gauge metal which provides an appropriate strength for the towing application. One or a series of resilient rods or blocks 62 are inserted within the resulting spaces between the fixed transverse core member 14 and torsion member 18. In the preferred embodiment resilient rods 62a–d are to be made of vulcanized rubber, however other resilient materials such as polyurethane could be employed. Receiving tube 28 for is secured perpendicularly to the floating torsion member 18 to receive a draw bar 30. The resilient rods or blocks 20 allows for limited pivotal motion by the torsion bar 18 in relationship to the fixed transverse core member 14 and bias the forces acting on the torsion bar 18 to properly stabilize the trailer. The arrangement of the flexible torsion member combined with the resilient members also allows for the limited pivoting of the draw bar receiver tube on a horizontal plane which thereby serves to dampen movement of the trailer. Although a series of elongate rods are depicted in the preferred embodiment, it is further contemplated that other arrangements of additional resilient members may be employed such as a series of resilient blocks that extend both along the length and around the circumference of the floating member or a resilient outer sleeve that completely surrounds the central core member.

Figure 3:
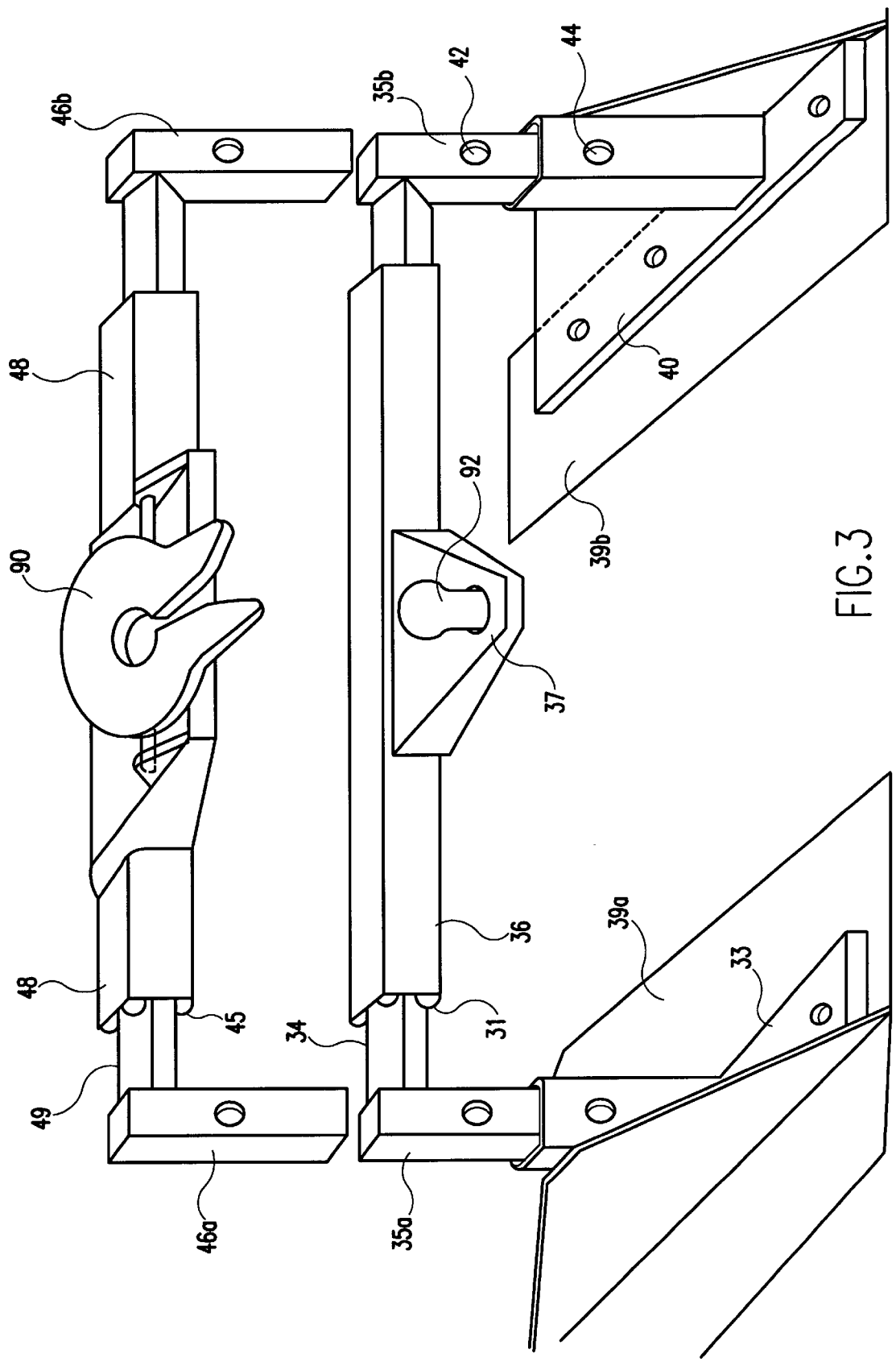
FIG. 3 is a perspective view of two alternative embodiments of the hitch connector assembly in accordance with the present invention.

FIG. 3 depicts an alternative embodiment of the invention that is designed to be mounted within a bed of a conventional pick-up truck. In this embodiment opposite piers 33 and 40 are provided that are fasten to the vehicle parts 39a and 39b. Piers 40 and 33 have tubular portions that receive upright members. In one embodiment upright members 35a and 35b support transverse fixed member 34 that receives floating member 36. The floating member 36 is attached to the fixed member using a plurality of resilient members in the same manner that is described above. Floating member 36 is attached to a hitch receiving member 37 that is adapted to receive a conventional ball hitch 92 that may be engaged to a coupler from a trailer. Also shown in FIG. 3 is an alternative king-pin collar 90 that is mounted on floating member 48. Like the ball hitch assembly, fixed transverse member 49 is attached to floating member 48 and is supported by opposite upright members 46a and 46b. These upright members 46a and 46b are received in the tubular section of piers 33 and 40.

The embodiment of the invention depicted in FIG. 3 provides for additional versatility because the hitch can be easily switched from a ball hitch to a king-pin hitch and the elevation of the hitch connection can be altered by raising or lowering the upright member within the piers. The upright members may be retained within the pier by the insertion of a pin or bolt (not shown) though hole 44 and 42 that are aligned to for a through-hole from one side of the tubular section of the pier to an opposite side. This connector pin assembly allows for a releasable interconnection between the trailer hitch and the vehicle. As shown, multiple holes in the mounting tubes allow for variations in the desired height of the hitch assembly.

Referring back to FIG. 5, in the preferred embodiment of the present invention, the floating torsion member 18 and fixed transverse core member 14 both have square cross-sections. The fixed transverse core member 14 is inserted within the floating torsion member 18 such that the fixed transverse core member 14 is oriented at a 45° angle relative to the floating torsion member 18. As a result of the orientation, at least four spaces run throughout the floating torsion member 18 at the interior corners of the torsion member housing. In this embodiment, the resilient rods 62a–d are inserted within the spaces formed between fixed transverse core member 14 and floating torsion member 18. The resilient rods 62a–d allow for a limited movement of the floating torsion member 18 and are effective to dampen the shock and vibration in both the vertical and longitudinal direction.

Figure 6:
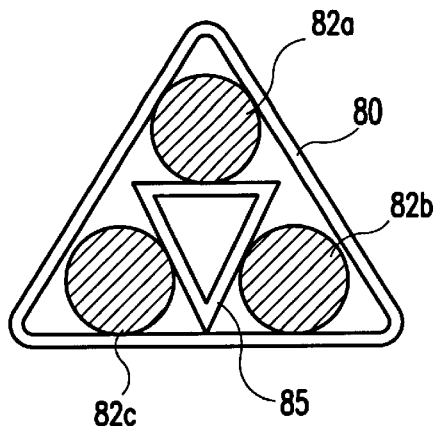
FIG. 6 is a cross section of an alternative embodiment of a transverse elongate member and floating member according to the invention.

FIG. 6 depicts an alternative embodiment of the arrangement of the floating member and core member. In this embodiment the floating torsion member and central core member both have triangular cross-sections. The central core member may be inserted into the torsion member such that the central core member has an upside down orientation relative to the torsion member. In this embodiment, the resilient rods can be inserted within the spaces formed between the central core member and torsion member.

Figure 4:
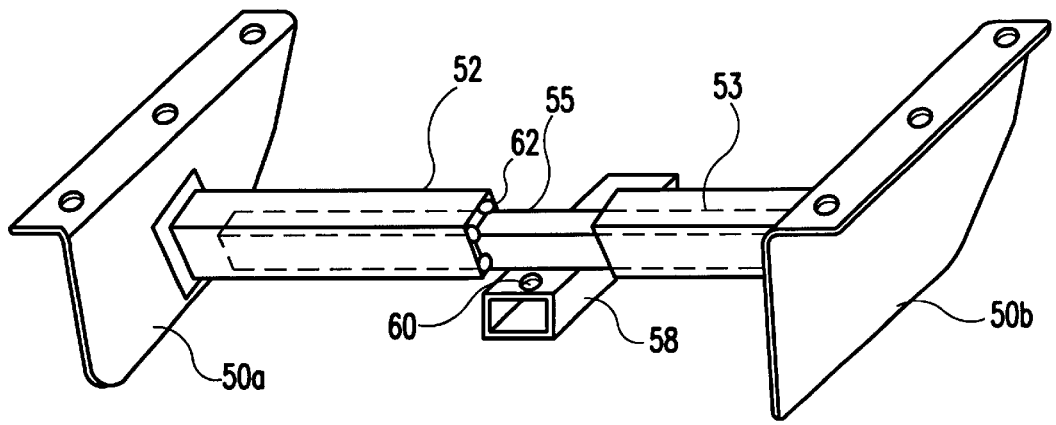
FIG. 4 is a perspective view of a further alternative embodiment of the hitch connector assembly in accordance with the present invention.

A further embodiment of the invention is depicted in FIG. 4. In this embodiment a floating torsion member 55 is attached to a draw bar receiving tube 58 and is inside opposite fixed tubular receiving members 52 and 53. The draw bar receiving tube 58 is adapted to receive a draw bar that includes a conventional ball hitch. Like the embodiments described above, the torsion member 55 is separated from the opposite fixed transverse tubular members 52 and 53 by a series of elongate resilient members that are oriented with respect to each other in parallel. The receiving member 52 is shown attached to mounting bracket 50a by flange. 56 however other manners of attachment such as welding are also contemplated. The arrangement depicted in FIG. 4 allows for further flexibility than the embodiment illustrated in FIG., 2 because the transverse receiving members 52 and 53 can independently flex with respect to the floating core member 55. A further advantage of the embodiment illustrated in FIG. 4 is that it allows the opposite brackets 50a and 50b to be mounted at different distances with respect to one another and therefore the assembly is easily adaptable to different vehicles.

Although the interior members in the embodiments described herein are described to be hollow members, it is further contemplated that the core of member in FIG. 2 and the torsion member depicted in FIG. 4 can also be solid members.

According to a manner in which to assemble the improved hitch assembly disclosed herein, a series of solid rubber rods are first cooled to very low temperature. For example, the rubber rods may be introduced to a vessel containing liquid nitrogen to cool the rods. Cooling the rubber causes the rubber to contract and also significantly reduces the frictional forces imposed by the rubber on surfaces. The rubber rods are then inserted into a steel pipe and then the second elongate member is inserted. As the rods warm, they expand and tightly engage the core member. In an alternative embodiment, the elongate members are first assembled and then the rubber or another elastomer is injected into any open cavities.

As apparent from the foregoing description, a trailer hitch of simple construction that significantly reduces shock and friction in a unique manner is disclosed. Because the dampening is effected along the length of the elongate member tube, the rubber or other elastomer used as the damping material will not quickly wear out, suffer from fatigue or lose its elastomeric properties. The construction of the hitch is such that the assembly may be readily mounted to vehicles which have varying frame and cargo bed sizes and configurations. The arrangement wherein a fixed member is retained with a torsion member by resilient rods provides both shock and vibrational dampening on both the vertical and longitudinal directions.

The invention having been described in detail with respect to preferred embodiments, and it will now be apparent from the foregoing to those skilled in the art that changes and modifications may be made without departing from the invention in its broader aspects, and the invention, therefore, as defined in the claims is intended to cover all such changes and modifications as fall within the true spirit of the invention.

What is claimed is:

1. A hitch mounting assembly for connecting a vehicle to a trailer assembly comprising:

an elongate fixed member oriented transverse to the direction of travel of a vehicle;

a elongate floating torsion member oriented transverse to the direction of travel of a vehicle, and a a hitch receiving member, wherein said fixed member and said torsion member are concentric to one another and separated from one another by at least one resilient member, and said elongate fixed member is affixable to a vehicle at or near the opposite extremities of said fixed member to a towing vehicle and said elongate floating torsion member is attached to said hitch receiving member at or near the midpoint of said elongate floating torsion member.

2. The hitch mounting assembly according to claim 1, wherein said elongate fixed member is inside said elongate floating torsion member.

3. The hitch mounting assembly according to claim 1, wherein said elongate floating torsion member is received within said elongate member said elongate fixed member.

4. The hitch mounting assembly recited in claim 1 said hitch receiving member comprises a draw bar receiving tube and said draw bar receiving tube is affixed to said elongate torsion member at or near the midpoint of said elongate floating torsion member.

5. The hitch mounting assembly as recited in claim 1 further comprising a pair of opposite piers, said piers adapted for receiving upright members, and said upright members supporting said elongate transverse fixed member and wherein said piers are affixable to said towing vehicle.

6. The hitch mounting assembly recited in claim 1 further comprising a bail shaped hitch receiving member.

7. The hitch mounting assembly recited in claim 1 and further comprising a king-pin hitch receiving member.

8. The hitch mounting assembly as recited in claim 1 wherein between said fixed member and said floating member are a plurality of resilient members.

9. A hitch mounting assembly according to claim 1, wherein said fixed member and said torsion member have a substantially square cross section.

10. A hitch mounting assembly for connecting a vehicle to a trailer assembly comprising:

an elongate torsion member oriented transverse to the direction of travel of a vehicle, means for receiving opposite ends of said torsion member to a towing vehicle wherein said means further comprise resilient members that frictionally engage said torsion bar, said means being affixable to a towing vehicle, a hitch receiving member, said hitch receiving member attached to said torsion member at or near the midpoint of said elongate floating torsion member wherein said means for receiving and said torsion member are concentric to one another.

11. The hitch mounting assembly as recited in claim 10 wherein said hitch receiving member comprises a draw bar tube wherein said draw bar tube is affixed to said torsion member.

* * * * *